United States Patent
Hintzsche et al.

(10) Patent No.: US 7,530,777 B2
(45) Date of Patent: May 12, 2009

(54) VEHICLE WITH SAFETY INTERLOCK SYSTEM

(75) Inventors: Bill Hintzsche, Manchester, IA (US); Mark Hollinrake, Marion, IA (US)

(73) Assignee: Henderson Manufacturing Company, Manchester, IA (US)

( * ) Notice: Subject to any disclaimer, the term of this patent is extended or adjusted under 35 U.S.C. 154(b) by 70 days.

(21) Appl. No.: 10/985,319

(22) Filed: Nov. 10, 2004

(65) Prior Publication Data

US 2005/0111946 A1 May 26, 2005

Related U.S. Application Data

(60) Provisional application No. 60/518,766, filed on Nov. 10, 2003.

(51) Int. Cl.
*B60P 1/00* (2006.01)
(52) U.S. Cl. .................... 414/519; 414/526
(58) Field of Classification Search .......... 414/545, 414/519, 526
See application file for complete search history.

(56) References Cited

U.S. PATENT DOCUMENTS

| 3,235,107 | A | | 2/1966 | Tift | |
|---|---|---|---|---|---|
| 3,322,429 | A | | 5/1967 | Cervelli | |
| 3,586,209 | A | * | 6/1971 | Keller | 222/627 |
| 4,234,109 | A | * | 11/1980 | Goodhart | 222/609 |
| 4,405,089 | A | * | 9/1983 | Taylor | 239/656 |
| 5,170,947 | A | * | 12/1992 | Houle et al. | 239/657 |
| 5,501,404 | A | | 3/1996 | Meyer et al. | |
| 5,860,604 | A | | 1/1999 | Kooiker | |
| 5,988,535 | A | | 11/1999 | Kime | |
| 6,068,200 | A | * | 5/2000 | Kime | 239/7 |
| 6,123,276 | A | * | 9/2000 | Ungerer et al. | 239/675 |
| 6,173,904 | B1 | * | 1/2001 | Doherty et al. | 239/1 |
| 6,186,731 | B1 | * | 2/2001 | Vickers et al. | 414/519 |
| 2002/0110443 | A1 | * | 8/2002 | Hollinrake et al. | 414/489 |

OTHER PUBLICATIONS

Photograph of a vehicle made by Swenson Spreader Company (Lindenwood, Illinois) and available in the U.S. prior to Nov. 10, 2003.
Photograph of a label affixed to the Swenson Spreader Company vehicle shown in AH.

* cited by examiner

*Primary Examiner*—Saúl J Rodríguez
*Assistant Examiner*—Joshua I Rudawitz
(74) *Attorney, Agent, or Firm*—Leydig, Voit & Mayer, Ltd.

(57) ABSTRACT

A safety interlock system is disclosed that can be selectively actuated to prevent or enable access to a conveyor mechanism of a spreader. When actuated to prevent access, the safety interlock prevents a top cover from moving to a position that allows access to the conveyor through an open top of the trough and prevents a hopper door from moving to an opened position wherein an operator can access the conveyor mechanism through a bottom opening of the trough. The safety interlock system can be configured such that a hydraulic drive motor is disconnected from the conveyor mechanism before allowing the top cover and the door to move to positions providing access to the conveyor mechanism.

5 Claims, 5 Drawing Sheets

FIG. 4
FIG. 5
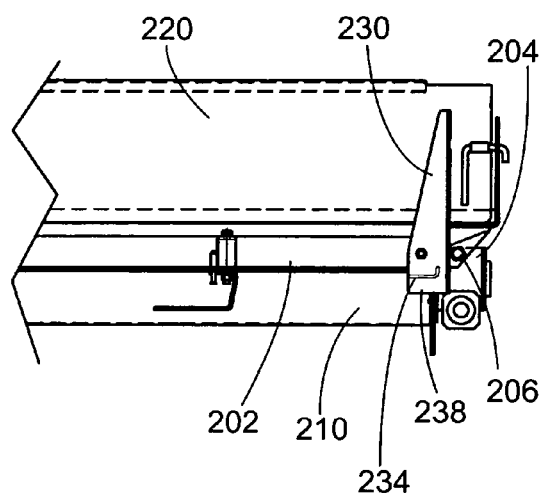
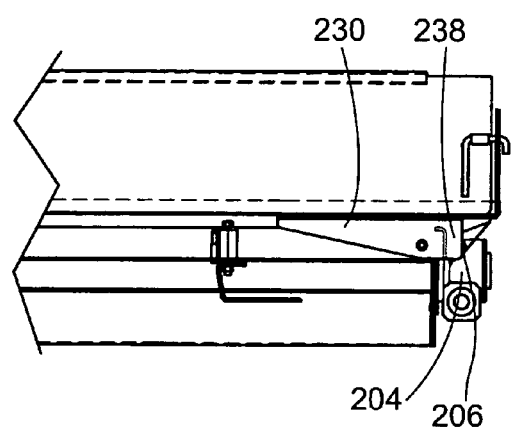

VEHICLE WITH SAFETY INTERLOCK SYSTEM

CROSS-REFERENCE TO RELATED PATENT APPLICATION

This application claims the benefit of U.S. Provisional Patent Application Ser. No. 60/518,766, filed Nov. 10, 2003, the entire disclosure of which is incorporated herein by reference in its entirety.

FIELD OF THE INVENTION

The present invention relates to a spreader device used in combination with a material supply body having a conveyor mechanism to selectively move particulate materials stored within the supply body.

BACKGROUND OF THE INVENTION

The distribution of particulate material onto surfaces, such as salt or sand onto roadways or fertilizer onto fields, is commonly provided by use of a chassis-mounted particulate supply body and an associated spreader device. One commonly-used supply body is frequently referred to as a "V-box" body. V-box bodies are open at the top to receive particulate material and have, when viewed from an end, a V-shaped sidewall configuration. The sloping sidewalls can function to direct the particulate material toward the lower portion of the body where the sidewalls meet.

Particulate material can be loaded into a V-box body through the open top portion, which can be selectively covered by one or more screens. The screens allow the material to pass therethrough into the storage area defined by the V-box body but prevent personnel from entering the storage area. A typical V-box body has at least two screens, with each screen being pivotally mounted to the V-box along a longitudinal center line thereof.

A conveyor assembly, such as an auger, can also be provided in the lower portion of the V-box body. The auger can extend from the front of the V-box for a predetermined amount, such as to the rear of the V-box body. The auger can function to selectively move the material from the front to the rear of the V-box body. To drive the conveyor mechanism, a hydraulic motor can be provided.

The spreader device can be located at the rear of the V-box body and can include a hopper having an inlet that receives particulate material from the V-box body and an outlet to distribute the particulates onto a surface. A rotatable spinner can be disposed underneath the outlet of the spreader to scatter the particulate material in a predetermined pattern across the surface over which the spreader travels.

To perform maintenance or clean up, personnel may desire to gain access to the auger disposed in the V-box body. It is desirable to provide a system to reduce the possibility of inadvertent activation of the conveyor mechanism when access thereto by personnel is possible.

BRIEF SUMMARY OF THE INVENTION

The invention provides a vehicle having a safety interlock system that reduces the possibility of inadvertent activation of a conveyor mechanism while direct access by personnel to the conveyor mechanism is possible. A vehicle can include an elongated body having a trough therein. The trough can have an open top and bottom. The conveyor mechanism can be located within the trough and can be accessed from the open bottom and top. A top cover and a bottom hopper door can be pivotally connected to the trough for selective movement between positions allowing access to the conveyor mechanism and positions preventing access to the mechanism. A hydraulic drive can be mounted to a first end of the spreader and be hydraulically connected to the conveyor mechanism.

The safety interlock can be selectively actuated to prevent or enable access to the conveyor mechanism. To actuate the safety interlock, a lever can be provided. The lever can be pivotally mounted to the trough, movable between a first position and a second position. In the first position, the lever prevents the top cover and the hopper door from moving to positions allowing operator access to the conveyor mechanism. In the second position, the lever allows the top cover and the hopper door to move to positions enabling access to the conveyor mechanism.

The safety interlock system can be configured such that the conveyor mechanism and the hydraulic drive are disconnected to allow the lever to be moved from the first position to the second position. In some embodiments, access to a hydraulic port connection will be prevented by the lever when the lever is in the second position such that it is not possible to hydraulically connect the conveyor mechanism to the hydraulic drive.

These and other features of the present invention will become apparent to one of ordinary skill in the art upon reading the detailed description in conjunction with the accompanying drawings.

BRIEF DESCRIPTION OF THE DRAWINGS

FIG. 4 is a fragmentary side view similar to FIG. 2, showing the lever in the first position and a bottom door in a closed position.

FIG. 5 is a view similar to FIG. 4, showing the lever in the second position and the bottom door in an open position.

DETAILED DESCRIPTION OF EMBODIMENTS OF THE INVENTION

Figure 1:
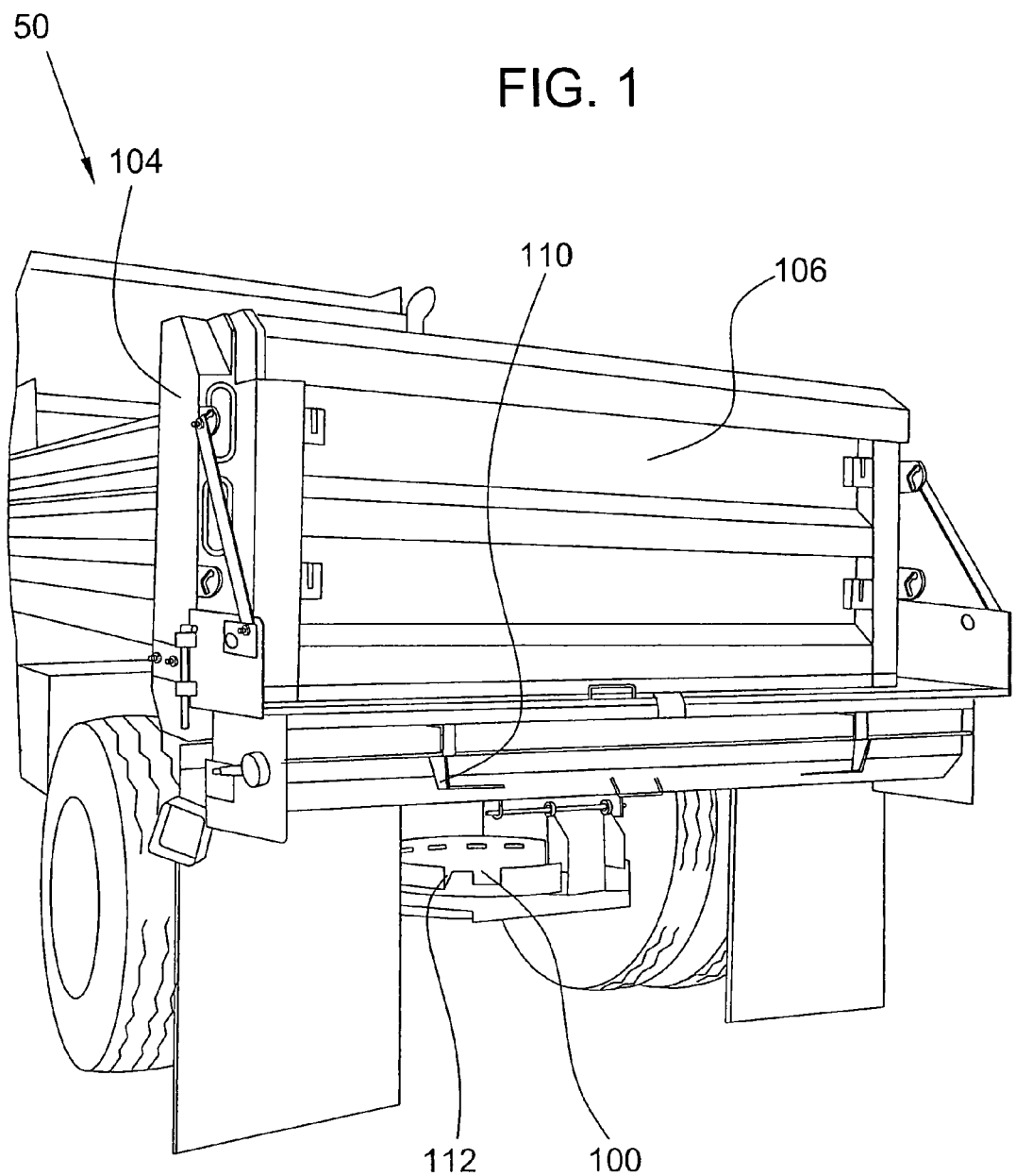
FIG. 1 is a rear, fragmentary perspective view of a vehicle having a spreader mounted thereto.

Now referring to the drawings, wherein like reference numbers refer to like elements, there is illustrated in FIG. 1 a vehicle 50 suitable for use with the present invention. The vehicle 50 can include a spreader 100 mounted to the rear end of a dump body 104. The spreader 100 can be located below a pivotally-mounted tailgate 106 of the dump body 104. The spreader 100 can selectively dispense granular material, such as de-icing material or fertilizer, stored in the dump body 104 onto the surface over which the vehicle 50 is traveling. In some embodiments of the spreader, a spinner assembly 112 can be located below an opening of the vehicle for conveying material to the spinner assembly 112, which in turn broadcasts the material in a predetermined pattern across the roadway.

Figure 2:
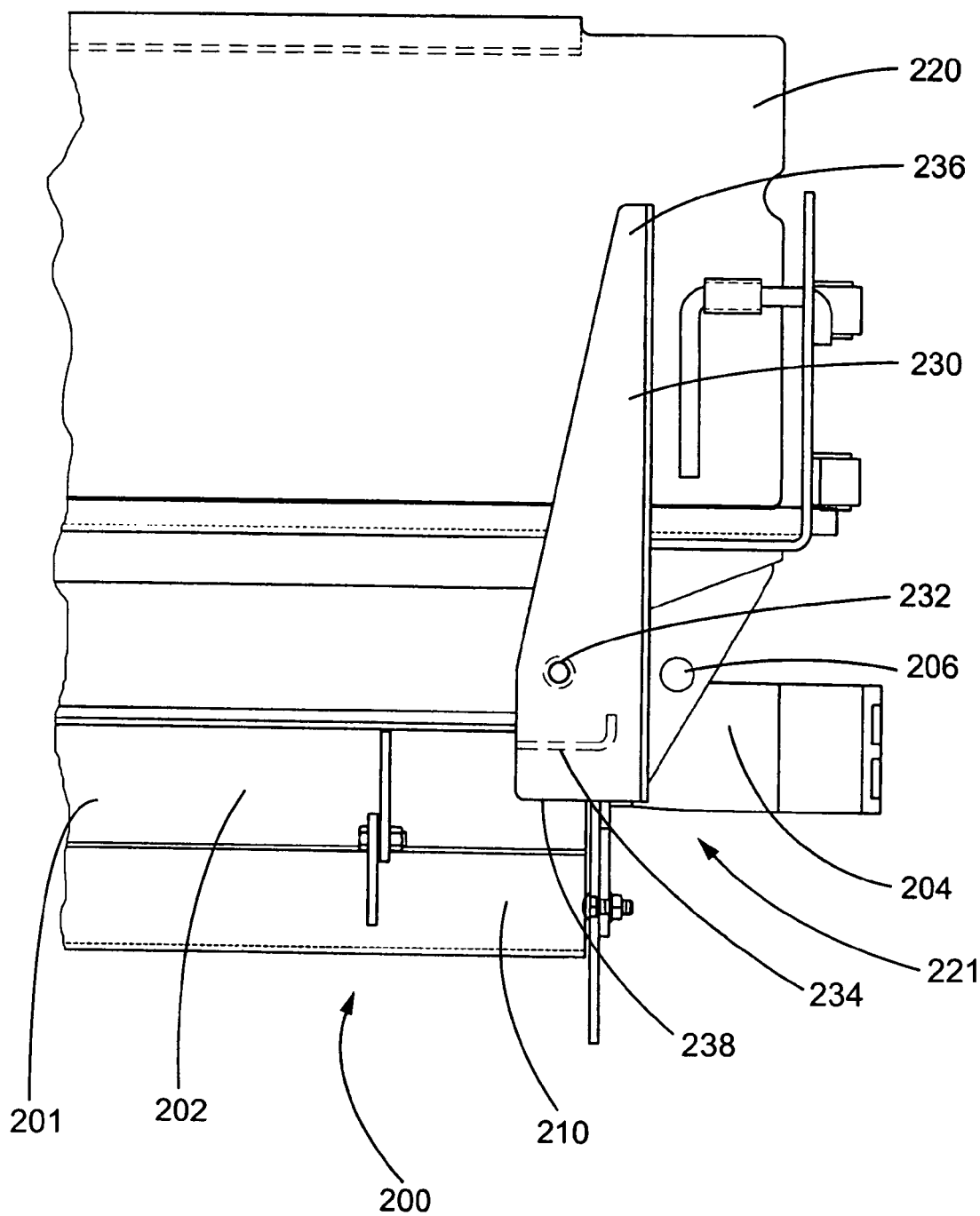
FIG. 2 is a fragmentary side elevational view of a vehicle having a safety interlock system according to the present invention, the safety interlock system including a lever disposed in a first position.
Figure 3:
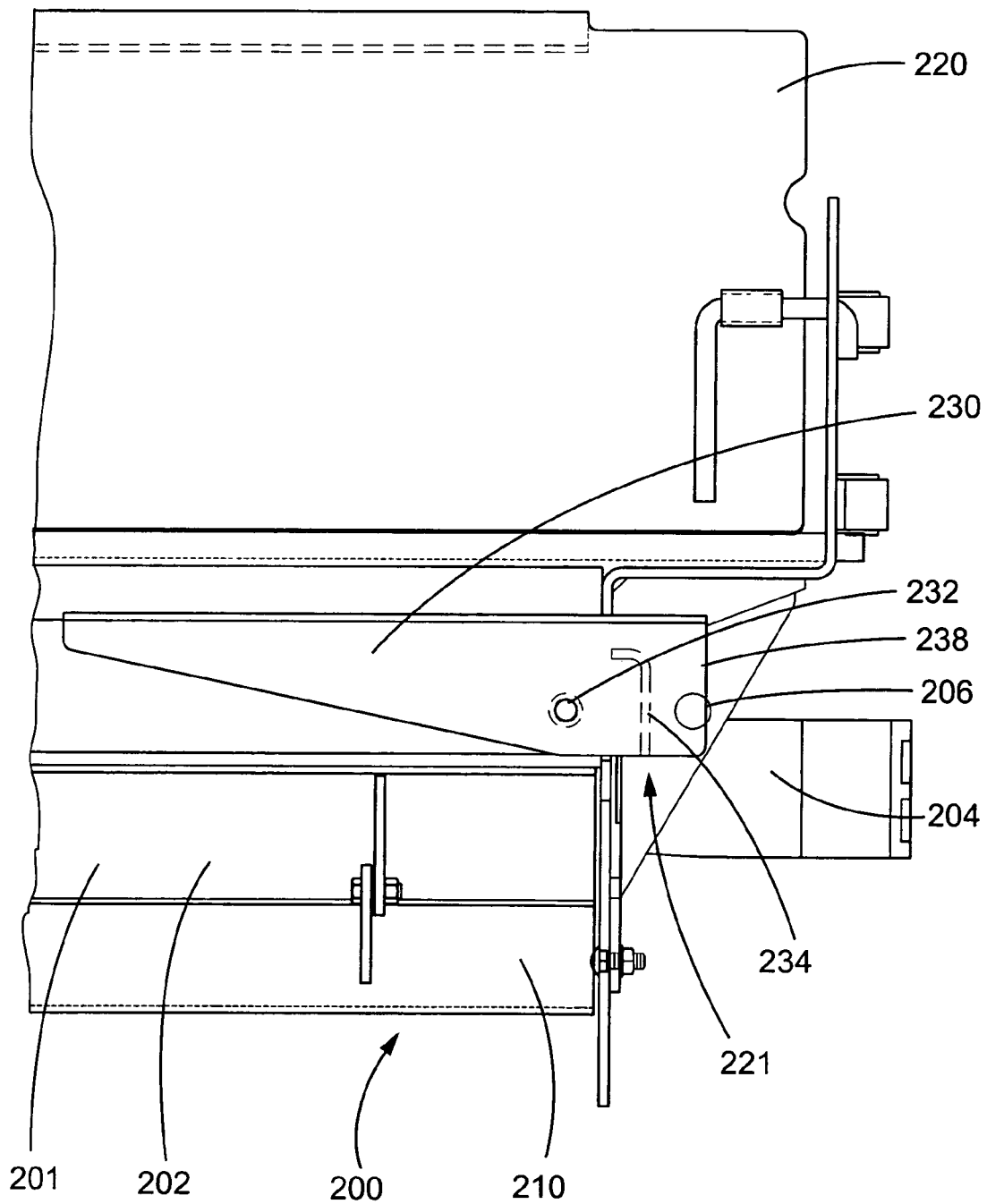
FIG. 3 is a view similar to FIG. 2, showing the lever disposed in a second position.

Referring to FIGS. 2 and 3, there is illustrated an embodiment of a vehicle 200 constructed in accordance with the teachings of the present invention. The vehicle 200 includes a body 201 having an elongated trough 202 therein. The body can be pivotally movable about a rear end thereof via a hoist. The trough 202 can include an open top and an open bottom. Located within and extending generally the length of the trough 202 is a conveyor mechanism. The conveyor mechanism can be any conventional conveying device, such as, a rotating auger for moving granular de-icing material along the length of the trough 202. To drive the conveyor mechanism, a hydraulic motor or drive 204 is mounted to a first end of the trough. Power can be transmitted from the hydraulic motor 204 to the conveyor mechanism via a hydraulic supply hose (see FIG. 6), for example.

The vehicle 200 includes a bottom cover or hopper door 210 pivotally attached to the trough 202. To allow an operator to access the conveyor mechanism to clear jams or to clean the conveyor, the hopper door 210 can be opened to expose the bottom of the trough 202. For operator safety, the hydraulic drive 204 is preferably disengaged from the conveyor mechanism when the hopper door 210 is opened.

The vehicle 200 also includes a top cover 220 pivotally attached to the trough 202. The top cover 220 can be positioned to allow an operator access to the conveyor mechanism, as well. To enclose the top of the trough, the top cover 220 can be disposed in a first, forward horizontal position wherein the top cover extends over the trough. When the top cover is in the forward horizontal position, the conveyor is completely covered by the top cover 220 and material from the dump body cannot pass into the conveyor. Disposing the top cover 220 in the forward horizontal position is desirable, for example, for stacking the unit when not installed on the vehicle or, when so installed, for using the vehicle for purposes other than dispensing material. An operator may desire to use the vehicle for such alternative uses during warm spells throughout the winter. It will be appreciated that when the top cover 220 is in the forward closed position, the conveyor mechanism is not accessible through the top of the trough 202.

To allow material to pass into the trough 202, the top cover 220 can be disposed in a second, vertical position wherein the conveyor mechanism is operable to transport material from the body. This is the position illustrated in FIG. 2. With the top cover 220 in the vertical position, material in the dump body can pass into the trough to the conveyor mechanism, which in turn can move material along the length of the trough for dispensing it from the vehicle.

To provide an operator access to the top of the trough 202 and the conveyor mechanism disposed therein, the top cover 220 can be disposed in a third, rearward horizontal position. For operator safety, the hydraulic drive 204 is preferably disengaged from the conveyor mechanism when the top cover 220 is in the rearward horizontal position.

For increasing operator safety, the vehicle 200 includes a safety interlock system 221 that can be selectively actuated to prevent access to the conveyor mechanism while the conveyor is connected to the hydraulic drive 204. To selectively actuate the safety interlock, a lever 230 can be provided which is rotatably mounted to the trough 202 by a pivot 232. The lever is an elongated member that includes a first end 236 and a second end 238. The lever can move between a vertical position, illustrated in FIG. 2, and a horizontal position, illustrated in FIG. 3. The safety interlock is actuated when the lever 230 is in the vertical position and is disengaged to enable access to the conveyor mechanism when the lever 230 is in the horizontal position.

Referring to FIGS. 2 and 4, the lever 230 is disposed in the vertical position wherein the lever is generally perpendicular with respect to the trough 202. In the vertical position, the lever 230 allows access to a hydraulic port 206 so that the hydraulic connection between the conveyor mechanism and the hydraulic drive 204 can be provided. The lever prevents operator access to the conveyor mechanism by interlocking the hopper door 210 and the top cover 220 when the lever 230 is in the vertical position. Particularly, the first end 236 of the lever prevents the top cover 220 from being moved to the rearward horizontal, or third, position thereby preventing operator access through the top of the trough to the conveyor. Likewise, the second end 238 of the lever prevents the hopper door 210 from opening, thereby preventing operator access to the conveyor. The second end 238 can include a latch 234 that engages the hopper door 210 to prevent it from being opened.

Referring to FIGS. 3 and 5, to allow operator access to the conveyor mechanism, the lever 230 can be disposed in the horizontal position. To allow the lever 230 to pivot to the horizontal position, the hydraulic supply hose is disconnected from the hydraulic port 206. In the horizontal position, the second end 238 of the lever 230 blocks the access port 206 to the hydraulic drive 204, thereby preventing the supply hose from being connected between the drive 204 and the conveyor. Accordingly, the supply hose connecting the hydraulic drive 204 and the conveyor mechanism is disengaged while the lever 230 is in the horizontal position, shown in FIG. 3. Disengaging the supply hose can be facilitated by providing the supply hose with a suitable quick-connect fitting, for example.

Figure 6:
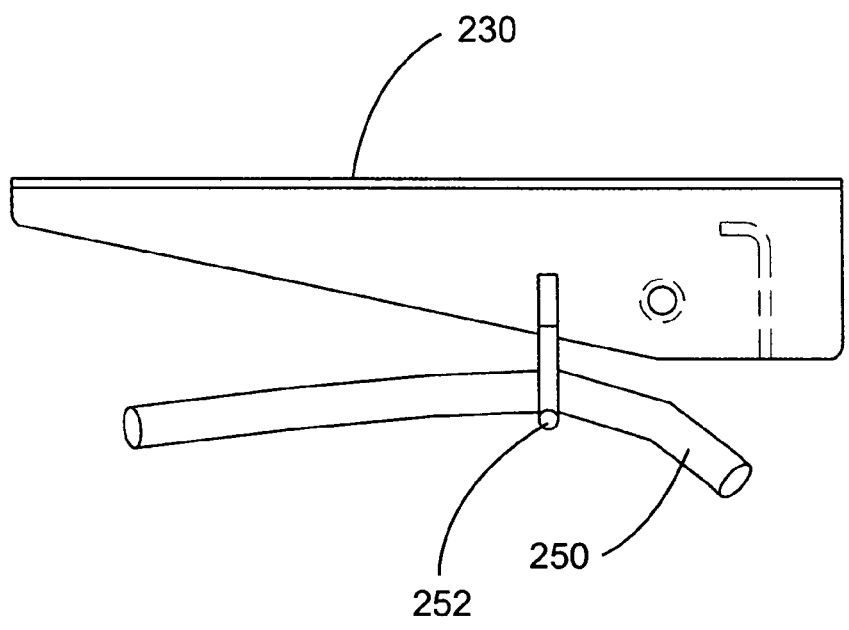
FIG. 6 is a side elevational view of the lever of FIG. 2 and a hydraulic supply hose supported by the lever.
Figure 7:
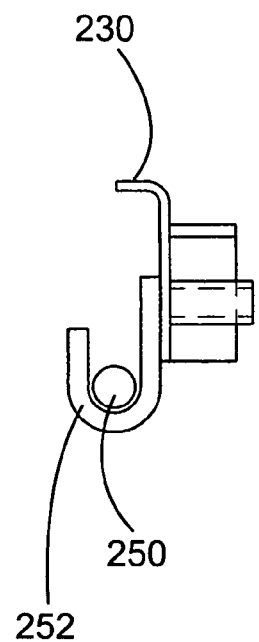
FIG. 7 is an end elevational view of the lever and the hydraulic supply hose of FIG. 5.

Referring to FIGS. 6 and 7, to store the hydraulic hose 250 when not connected, the lever 230 can include a support 252. Also, as will be appreciated from FIG. 3, when the lever 230 is in the horizontal position, the top cover 220 and the hopper door 210 can be moved to positions that allow access to the conveyor mechanism. Specifically, the top cover 220 can be moved to the rearward horizontal position, and the hopper door 210 can be opened.

The present invention can include other features as described in U.S. Pat. No. 6,123,276, entitled, "Interlock System For Spreader Bodies," which is incorporated herein by this reference in its entirety.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle for dispensing material comprising:
    a hopper having an elongated trough and an access opening;
    a conveyor mechanism disposed in the trough such that it is accessible through the access opening;
    a hydraulic drive mounted to the hopper and hydraulically connectable to the conveyor mechanism via a hydraulic line;
    a cover movably mounted to the hopper such that the cover is movable between a closed position wherein the cover seals the access opening of the hopper and an open position wherein the cover is disposed to allow access to the conveyor mechanism through the access opening;
    an interlock system for preventing access to the conveyor mechanism when the hydraulic drive is hydraulically connected to the conveyor mechanism, the interlock system comprising a lever and a hydraulic access port, the lever movable between a first position wherein the lever prevents the cover from moving to the open position and a second position wherein the lever is disposed such that the cover is movable to the open position, the hydraulic access port engageable with the hydraulic line to hydraulically connect the hydraulic drive and the conveyor mechanism, the lever and the hydraulic access port arranged with respect to each other such that, when the lever is in the first position, the hydraulic line is connectable to the hydraulic access port and such that, when the lever is in the second position, the lever covers the hydraulic access port such that the hydraulic line is not engageable with the hydraulic access port thereby preventing the hydraulic line from hydraulically connecting the hydraulic drive and the conveyor mechanism, and wherein, to move the lever from the first position to the second position, the hydraulic line is disengaged from the hydraulic access port;
    wherein the lever is an elongated member including a first end and a second end, the second end of the lever blocking the access port when the lever is in the second position; and
    wherein the lever is mounted by a pivot disposed between the first and second ends and is rotatable between the first position and the second position.

2. The vehicle of claim 1, wherein the lever includes a latch for engaging the cover when the lever is in the first position.

3. The vehicle of claim 1, wherein the hopper includes a second access opening, and further comprising:
    a second cover movably mounted to the hopper such that the second cover is movable between a closed position wherein the second cover seals the second access opening of the hopper and an open position wherein the second cover is disposed to allow access to the conveyor mechanism through the second access opening;
    wherein, when the lever is in the first position, the lever prevents the second cover from moving to the open position.

4. The vehicle of claim 1, wherein the conveyor mechanism comprises an auger.

5. The vehicle of claim 1, wherein the lever includes a support for storing the hydraulic line when it is disengaged from the hydraulic access port.

* * * * *